United States Patent
Wu

(10) Patent No.: US 9,204,391 B2
(45) Date of Patent: Dec. 1, 2015

(54) POWER MANAGEMENT DEVICE AND METHOD OF WIRELESS SENSOR NETWORK

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Dan-Dan Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 130 days.

(21) Appl. No.: 14/058,346

(22) Filed: Oct. 21, 2013

(65) Prior Publication Data

US 2015/0018025 A1 Jan. 15, 2015

(30) Foreign Application Priority Data

Jul. 9, 2013 (CN) .......................... 2013 1 0286611

(51) Int. Cl.
*H04W 4/00* (2009.01)
*H04W 52/02* (2009.01)
*H04W 84/18* (2009.01)

(52) U.S. Cl.
CPC .......... *H04W 52/0219* (2013.01); *H04W 4/005* (2013.01); *H04W 84/18* (2013.01); *H04W 4/006* (2013.01)

(58) Field of Classification Search
USPC ............ 455/41.2, 446, 500, 509, 422.1, 11.1, 455/67.11, 524, 507, 7, 574, 453; 370/312, 370/389, 351, 400, 532, 254, 392, 238, 252, 370/232, 328, 235
See application file for complete search history.

(56) References Cited

U.S. PATENT DOCUMENTS

| | | | | |
|---|---|---|---|---|
| 6,026,303 | A * | 2/2000 | Minamisawa | 455/446 |
| 8,725,185 | B2 * | 5/2014 | Ozaki et al. | 455/509 |
| 2004/0059811 | A1 | 3/2004 | Sugauchi et al. | |
| 2005/0078672 | A1 * | 4/2005 | Caliskan et al. | 370/389 |
| 2008/0031197 | A1 * | 2/2008 | Wang et al. | 370/331 |

(Continued)

FOREIGN PATENT DOCUMENTS

| | | |
|---|---|---|
| CN | 101841884 A | 9/2010 |
| CN | 201897884 U | 7/2011 |

(Continued)

*Primary Examiner* — Ganiyu A Hanidu
(74) *Attorney, Agent, or Firm* — Novak Druce Connolly Bove + Quigg LLP

(57) ABSTRACT

A power management device of a wireless sensor network includes a setting unit, a detecting unit and a selecting unit. The setting unit sets relay nodes to work in a fully-functional operating mode and sets ordinary nodes to work in a semi-functional operating mode. The detecting unit detects whether powers consumptions of multiple relay nodes are lower than a threshold, confirms that a relay node is lack of power when the power of the relay node is lower than a threshold and collects power information and address information of ordinary nodes. The selecting unit selects a new relay node according to the collected power information and address information of the ordinary nodes, and sets the low-power-reserves relay node as an ordinary node. A power management method of the wireless sensor network is also provided.

6 Claims, 5 Drawing Sheets

(56) References Cited

U.S. PATENT DOCUMENTS

| | | | |
|---|---|---|---|
| 2008/0242328 A1* | 10/2008 | Kummer et al. | 455/500 |
| 2010/0255781 A1* | 10/2010 | Wirola et al. | 455/41.2 |
| 2011/0223900 A1* | 9/2011 | Yu et al. | 455/422.1 |
| 2013/0021932 A1 | 1/2013 | Damnjanovic et al. | |

FOREIGN PATENT DOCUMENTS

| | | |
|---|---|---|
| CN | 102149160 A | 8/2011 |
| CN | 202551223 U | 11/2012 |

* cited by examiner

POWER MANAGEMENT DEVICE AND METHOD OF WIRELESS SENSOR NETWORK

BACKGROUND

1. Technical Field

Embodiments of the present disclosure generally relate to power management, and more particularly to a power management device and method of a wireless sensor network (WSN).

2. Description of Related Art

Fully-functional and semi-functional sensors are deployed in wireless sensor networks as network nodes. The fully-functional sensors can collect data, forward data, and communicate with a power management device of the wireless sensor network. The semi-functional sensors can only collect and forward data and communicate with other sensors as relay nodes.

Currently, there are two power management methods of wireless sensor networks:

1. The power management device sets a sleep cycle for network nodes, allowing nodes to take turns in sleeping and working 2. Network nodes periodically exchange information, and then change the information transfer paths of the wireless sensor network according to power information exchanged between network nodes.

The first method does not specifically consider the actual situation of each network node. That is, the first method is not based on the actual power of each network node and positional relationships between network nodes for dispatching power. Although the second method considers the actual power condition of each network node, the exchange of electricity involving each network node results in high energy consumption. In addition, a simple changing of the information transfer paths does not effectively reduce the power consumption of each network node.

DETAILED DESCRIPTION

Figure 1:
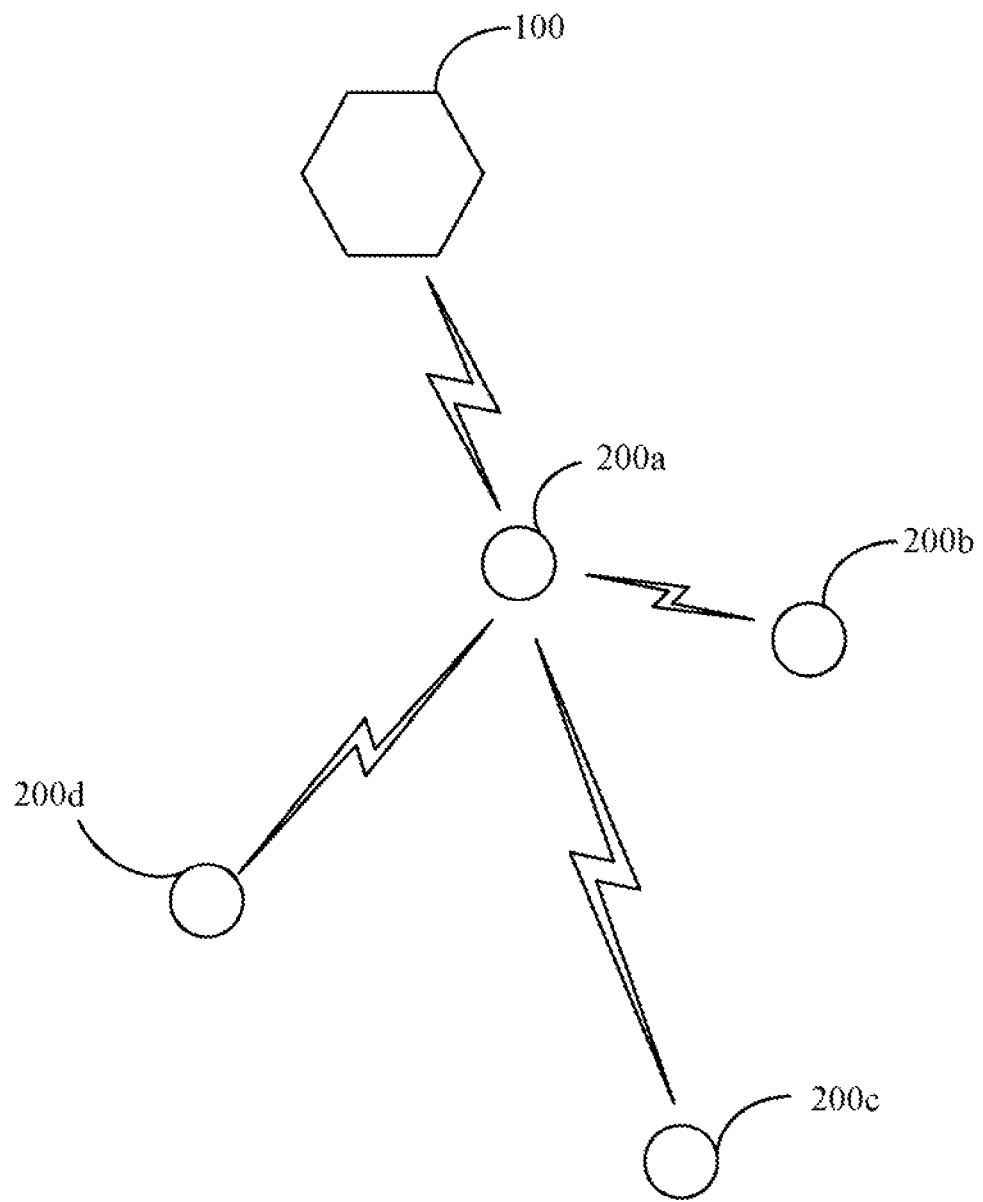
FIG. 1 is a schematic diagram of an application environment of a power management device in accordance with one embodiment of the present disclosure, showing one example of operation of the application environment.

The embodiments are illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "unit," as used hereinafter, refers to logic embodied in hardware or firmware, or to a collection of software instructions, written in a programming language such as, for example, Java, C, or assembly. One or more software instructions in the units may be embedded in firmware such as in an erasable-programmable read-only memory (EPROM). It will be appreciated that units may comprise connected logic units, such as gates and flip-flops, and may comprise programmable units, such as programmable gate arrays or processors. The units described herein may be implemented as either software and/or hardware units and may be stored in any type of computer-readable medium or other computer storage device.

FIG. 1 is a schematic diagram of an application environment of a power management device 100 in accordance with one embodiment of the present disclosure. In the present embodiment, the power management device 100 and a plurality of network nodes 200a-200d collectively form a wireless sensor network (WSN). In the present embodiment, the network nodes 200a-200d are fully-functional sensors, and each can be optionally set to work in a fully-functional operating mode or a semi-functional operating mode. In one example of operation of the application environment, the network node 200a is a relay node for collecting information of one or more surrounding environments, and for communicating with the network nodes 200b-200d and the power management device 100. The network nodes 200b-200d are ordinary nodes for collecting information of one or more environments, and for communicating with the network node 200a. The power management device 100 controls the network nodes 200b-200d by communicating with the network node 200a.

Figure 3:
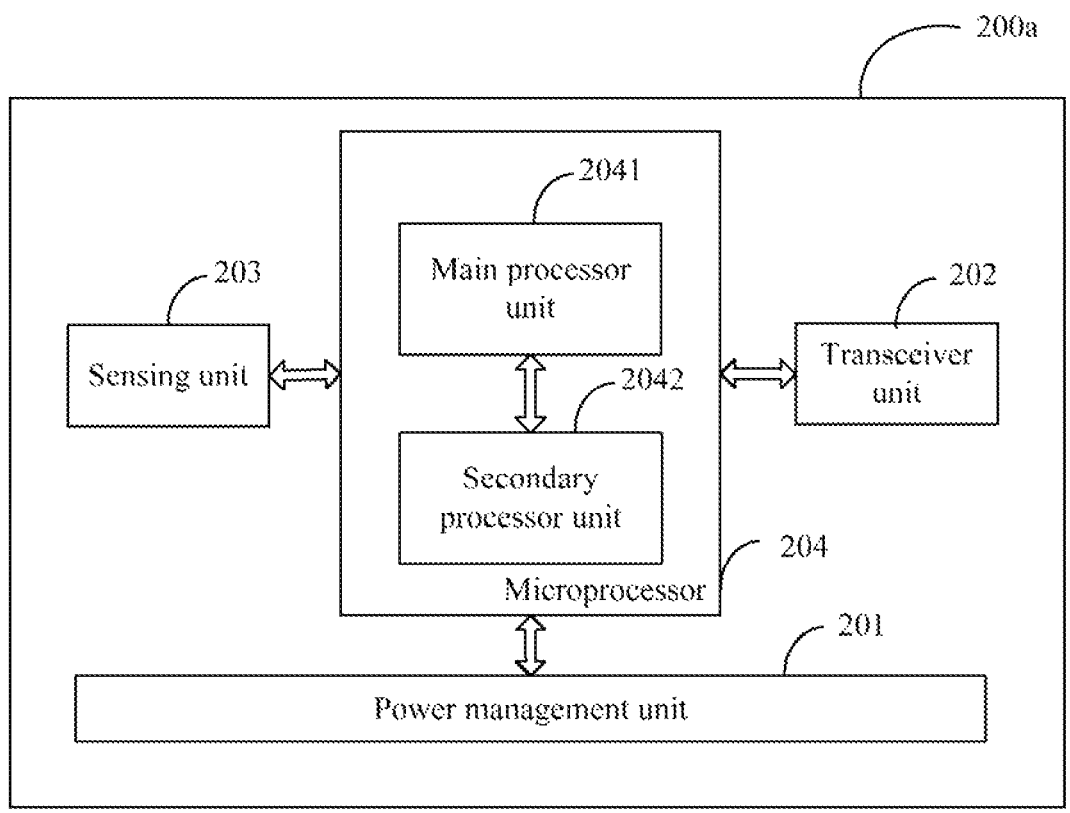
FIG. 3 is a block diagram of functional units of one of network nodes in FIG. 1.

FIG. 3 is a block diagram of functional units of the network node 200a. The network nodes 200a-200d all have substantially the same structure, and the network node 200a is hereinafter used as an example of all the network nodes 200a-200d. The network node 200a includes a power management unit 201, a transceiver unit 202, a sensing unit 203 and a microprocessor 204. The microprocessor 204 includes a main processor unit 2041 and a secondary processor unit 2042. The power management unit 201 manages the power situation of the network node 200a, and reports the power situation to the power management device 100 according to query commands regarding power. The transceiver unit 202 transmits and receives data. The sensing unit 203 collects environmental data. The main processor unit 2041 controls the forwarding of data and communications with the power management device 100, and the secondary processor unit 2042 controls the collecting of data and communications with the ordinary nodes. The network node 200a has a fully-functional operating mode and a semi-functional operating mode. The network node 200a acting as the relay node works in the fully-functional operating mode, under which the main processor unit 2041 and the secondary processor unit 2042 work simultaneously. The network node 200a acting as an ordinary node works in the semi-functional operating mode, under which the secondary processor unit 2042 works and the main processor unit 2041 sleeps.

In the present embodiment, the power management device 100 periodically monitors power information of the network node 200a acting as the relay node, and determines whether the power of the network node 200a is lower than a preset threshold. When the power of the network node 200a is equal to or higher than the threshold, the power management device 100 maintains the network node 200a as the relay node. When the power of the network node 200a is lower than the threshold, the power management device 100 requests the network node 200a to transmit query requests regarding power to the network nodes 200b-200d. Meanwhile, the network nodes 200b-200d continue to act and work as ordinary nodes; and the network node 200a collects the power information and address information returned by each of the network nodes 200*b*-200*d*, and informs the power management device 100 accordingly. In the present embodiment, the power information comprises reserve power of the network nodes 200*b*-200*d*, and the address information comprises information on distances from the network node 200*a* to the network nodes 200*b*-200*d*.

In the present embodiment, the power management device 100 analyzes received power information and address information, and selects one network node from among the network nodes 200*b*-200*d* to act as a new relay node. The power of the selected network node 200*b*, 200*c* or 200*d* is higher than the power of the network node 200*a*. For example, the power management device 100 selects the network node 200*b* to act as a new relay node, wherein the power of the network node 200*b* is higher than the power of the network node 200*a*. Thus, the power management device 100 sets the network node 200*b* to work in the fully-functional operating mode, and accordingly the main processor unit 2041 of the network node 200*b* then begins to work. The power management device 100 sets the network node 200*a* to work in the semi-functional mode, and accordingly the main processor unit 2041 of the network node 200*a* begins to sleep. That is, the main processor unit 2041 of the network node 200*a* enters a state of dormancy, and thereby the network node 200*a* saves power.

Figure 2:
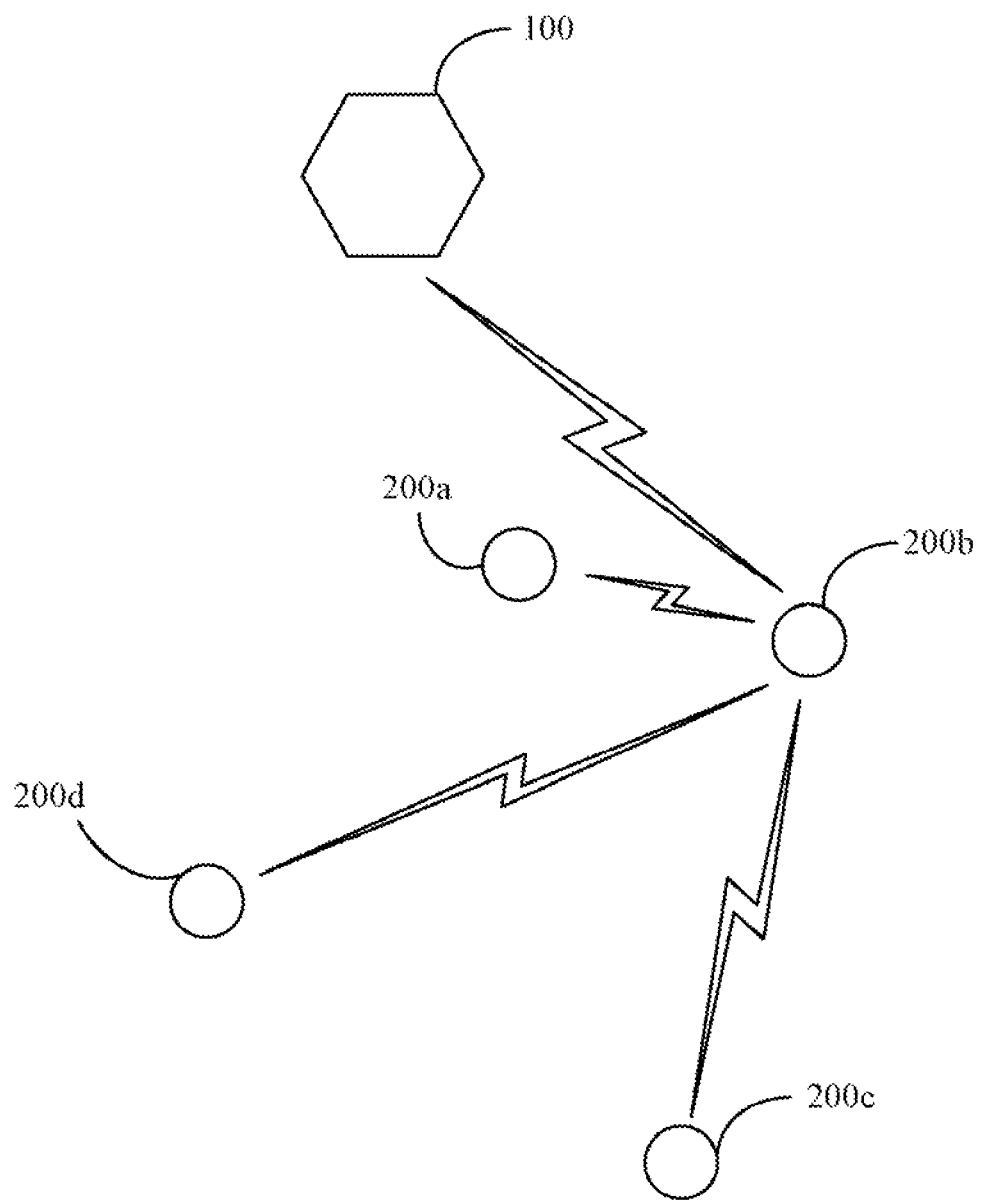
FIG. 2 is similar to FIG. 1, but showing another example of operation of the application environment.

FIG. 2 is a schematic diagram of the above-described application environment of the power management device 100, but showing another example of operation of the application environment. In the illustrated operation of the application environment, the network node 200*b* communicates with the power management device 100, and with the network nodes 200*a*, 200*c* and 200*d*. That is, the network node 200*b* acts as a relay node, and the network nodes 200*a*, 200*c* and 200*d* act as ordinary nodes.

Referring again to FIG. 1, in one embodiment, when the power of the network node 200*a* acting as the relay node is lower than the threshold, and the powers of the network nodes 200*b*-200*d* are all lower than the power of the network node 200*a*, the power management device 100 continues the role of the network node 200*a* as a relay node.

In another embodiment, when the power of the network node 200*a* acting as the relay node is lower than the threshold, the power management device 100 separately calculates a plurality of ratios between a plurality of distances and the respective powers of neighboring ordinary nodes among the network nodes 200*b*-200*d*. In the illustrated embodiment, all of the network nodes 200*b*-200*d* neighbor the network node 200*a*, and so all of the network nodes 200*b*-200*d* are neighboring ordinary nodes for the purposes of performing the calculations. The calculations are made according to the power information and the address information of the neighboring ordinary network nodes 200*b*-200*d*. The power information comprises reserve power of the neighboring network nodes 200*b*-200*d*, and the address information comprises information on distances between each of the neighboring ordinary network nodes 200*b*-200*d* and the relay network node 200*a*. The power management device 100 selects a new relay node from among the network nodes 200*b*-200*d*, wherein the selected new relay network node 200*b*, 200*c* or 200*d* corresponds to the smallest ratio among the plurality of ratios. FIG. 2 shows the situation where the selected new relay node is the network node 200*b*.

Figure 4:
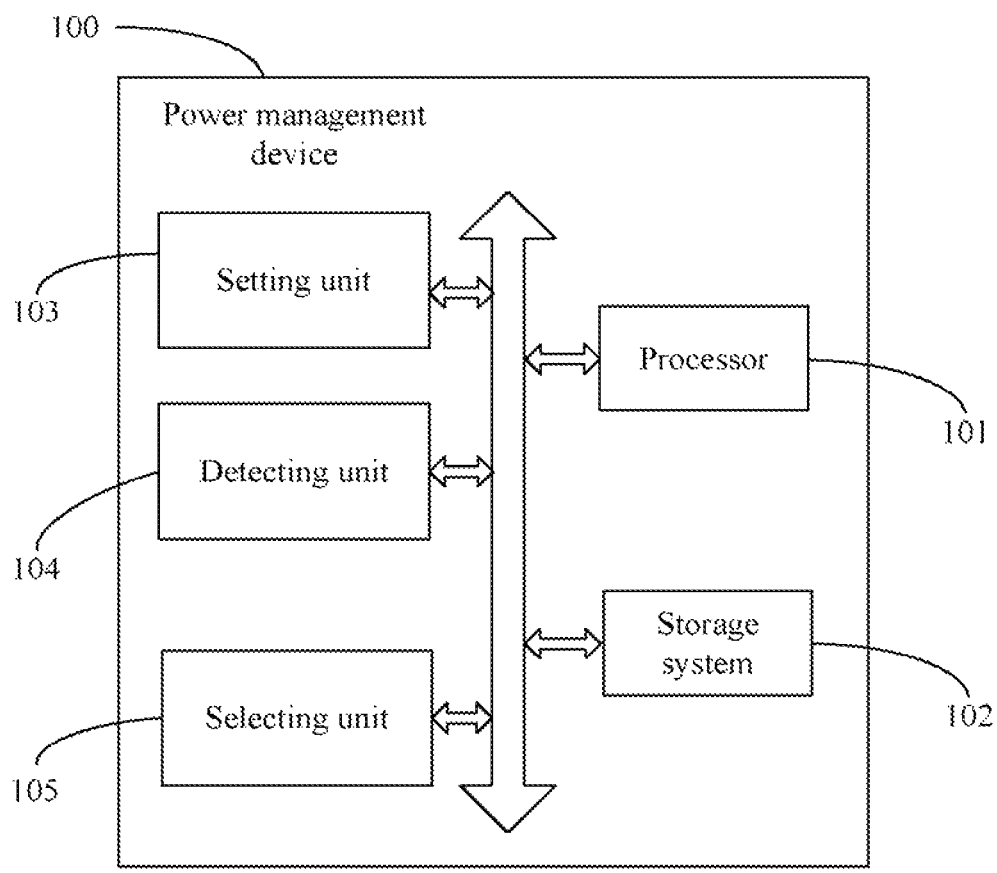
FIG. 4 is a block diagram of functional units of the power management device in FIG. 1.

Referring to FIG. 4, this is a block diagram of function modules of the power management device 100. The power management device 100 includes a processor 101, a storage system 102, a setting unit 103, a detecting unit 104, and a selecting unit 105. The units 103-105 are executable programs stored in the storage system 102, and the processor 101 executes the programs and actualizes the function of each program.

The setting unit 103 sets the network node 200*a* to act as the relay node working in the fully-functional operating mode after the power management device 100 begins to work, and the setting unit 103 also sets the network nodes 200*b*-200*d* to work in the semi-functional operating mode.

The detecting unit 104 transfers a query command regarding power to the network node 200*a*, and detects whether a power of the network node 200*a* is lower than the threshold according to power information reported by the network node 200*a*. When the power of the network node 200*a* is lower than the threshold, the detecting unit 104 confirms that the network node 200*a* lacks reserves of power. Further, the detecting unit 104 collects the power information and the address information of neighboring network nodes 200*b*-200*d* of the network node 200*a*.

The selecting unit 105 selects the new relay node according to the power information and the address information of the network nodes 200*b*-200*d*, and sets the network node 200*a* as an ordinary node after selecting the new relay node from among the network nodes 200*b*-200*d*.

In the present embodiment, when the new relay network node 200*b*, 200*c* or 200*d* (as the case may be) has been selected, the setting unit 103 sets the new relay network node 200*b*, 200*c* or 200*d* to work in the fully-functional operating mode, sets the network node 200*a* to act as an ordinary node, and also sets the network node 200*a* to work in the semi-functional operating mode.

In the present embodiment, when the power of the network node 200*a* acting as the relay node is lower than the threshold, the selecting unit 105 selects a network node from among the network nodes 200*b*-200*d* to act as a new relay node, upon condition that the power of the new relay node is the highest among the network nodes 200*b*-200*d* and is also higher than that of the network node 200*a*.

In the present embodiment, when the power of the network node 200*a* acting as the relay node is lower than the threshold and none of the network nodes 200*b*-200*d* has a higher power than the network node 200*a*, the selecting unit 105 maintains the network node 200*a* as the relay node.

In another embodiment, when the power of the network node 200*a* acting as the relay node is lower than the threshold, the selecting unit 105 separately calculates a plurality of ratios between a plurality of distances and the powers of the neighboring ordinary network nodes among the network modes 200*b*-200*d*. In the illustrated embodiment, all of the network nodes 200*b*-200*d* neighbor the network node 200*a*, and so all of the network nodes 200*b*-200*d* are neighboring ordinary nodes for the purposes of performing the calculations. The calculations are made according to the power information and the address information of the neighboring ordinary network nodes 200*b*-200*d*. The power information comprises reserve power of the neighboring network nodes 200*b*-200*d*, and the address information comprises information on distances between each of the neighboring ordinary network nodes 200*b*-200*d* and the relay network node 200*a*. Then the selecting unit 105 selects the new relay node from among the network nodes 200*b*-200*d* which corresponds to the smallest of the plurality of ratios.

Figure 5:
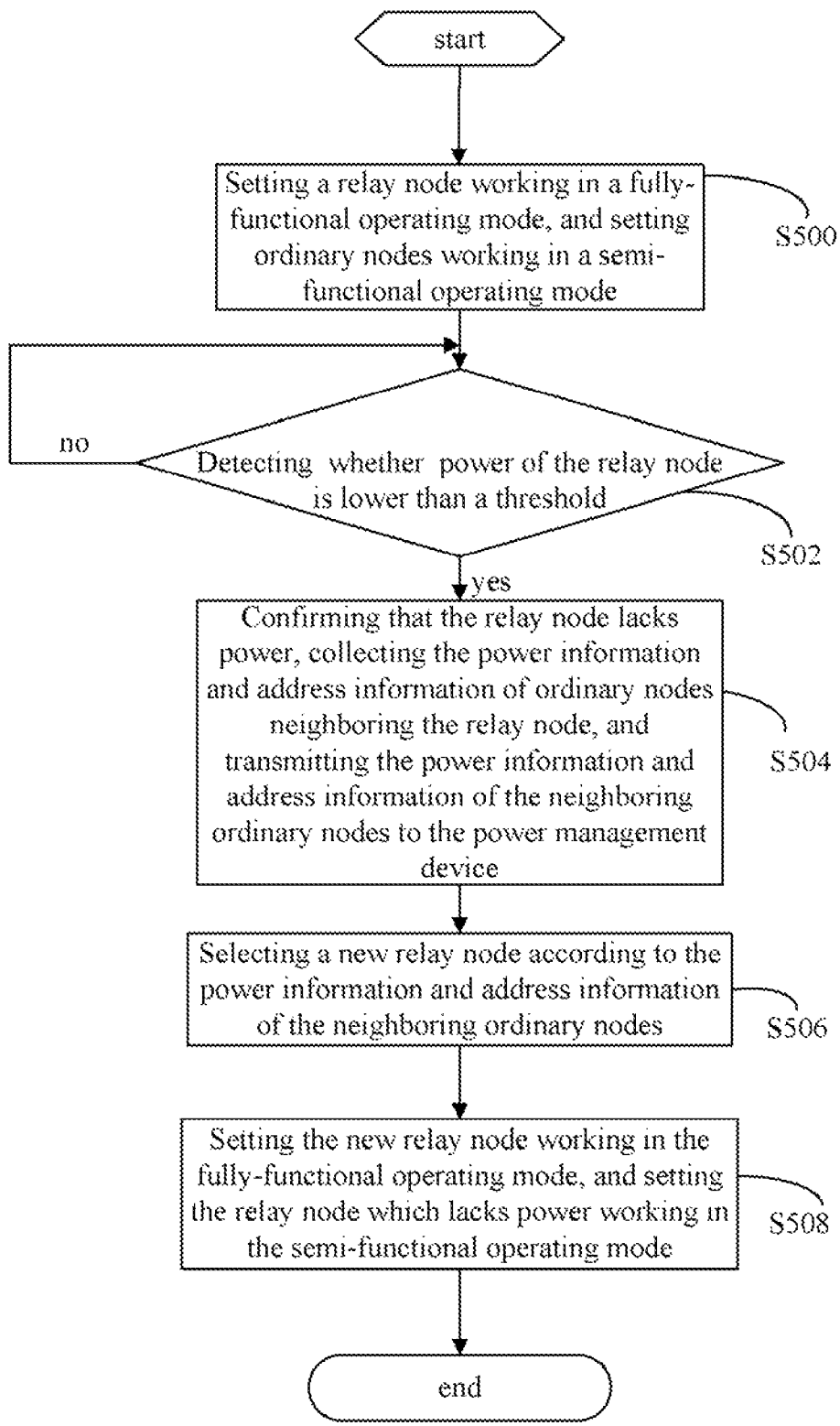
FIG. 5 is a flowchart of one embodiment of a power management method in accordance with the present disclosure, the method utilizing the power management device of FIG. 4.

FIG. 5 is a flowchart of one embodiment of a power management method in accordance with the present disclosure, the method utilizing the power management device 100. In the described embodiment, the method is carried out in the application environment illustrated in FIG. 1, and is executed by (inter alia) the setting unit 103, the detecting unit 104 and the selecting unit 105 of the power management device 100 (see FIG. 4).

In block S500, the setting unit 103 sets the network node 200*a* to act as the relay node working in the fully-functional operating mode, and sets the network nodes 200*b*-200*d* to work in the semi-functional operating mode.

In block S502, the detecting unit 104 detects whether the power of the network node 200*a* is lower than the threshold.

In block S504, when the power of the network node 200*a* is lower than the threshold, the detecting unit 104 confirms that the network node 200*a* lacks reserves of power, collects the power information and the address information of neighboring network nodes 200*b*-200*d* of the network node 200*a*, and transmits the power information and the address information to the selecting unit 105.

In block S506, the selecting unit 105 selects the new relay node according to the power information and the address information of the network nodes 200*b*-200*d*.

In block S508, the setting unit 103 sets the new relay network node 200*b*, 200*c* or 200*d* (as the case may be) to work in the fully-functional operating mode, and sets the network node 200*a* to work in the semi-functional operating mode.

In one embodiment of block S506, the selecting unit 105 selects the new relay node from among the network nodes 200*b*-200*d* according to the network node 200*b*, 220*c* or 200*d* whose power is highest among the network nodes 200*b*-200*d*, wherein the power of the selected network node 200*b*, 220*c* or 200*d* is higher than that of the network node 200*a*.

In another embodiment of block S506, when the power of the network node 200*a* acting as the relay node is lower than the threshold, the selecting unit 105 separately calculates a plurality of ratios between a plurality of distances and the powers of the neighboring ordinary network nodes 200*b*-200*d* according to the power information and the address information of the neighboring ordinary network nodes 200*b*-200*d*. The power information comprises reserve power of the neighboring ordinary network nodes 200*b*-200*d*, and the address information comprises information on distances between each of the neighboring ordinary network nodes 200*b*-200*d* and the relay network node 200*a*. Then the selecting unit 105 selects the new relay node from among the network nodes 200*b*-200*d* which corresponds to the smallest of the plurality of ratios.

In a further embodiment of the method, instead of performing block S506, the following actions are performed after block S504. When the power of the network node 200*a* acting as the relay node is lower than the threshold, and none of the neighboring network nodes 200*b*-200*d* has a higher power than the network node 200*a*, the selecting unit 105 maintains the network node 200*a* as the relay node. In such case, block S508 is also omitted.

In summary, the power management device 100 and the power management method of the above-described wireless sensor network can adjust the communication paths and the modes of working of a plurality of network nodes 200*a*-200*d*. Continued working of the network nodes 200*a*-200*d* is ensured, and the energy consumption of the wireless sensor network can be continuously minimized dynamically.

While various embodiments and methods have been described above, it should be understood that they have been presented by way of example only and not by way of limitation. Thus the breadth and scope of the present disclosure should not be limited by the above-described embodiments, and should be at least commensurate with the following claims and their equivalents.

What is claimed is:

1. A power management device of a wireless sensor network, for controlling a plurality of network nodes of the wireless sensor network, the plurality of network nodes comprising at least one relay node and a plurality of ordinary nodes, and each of the network nodes configured to selectively work in a fully-functional operating mode or a semi-functional operating mode, the power management device comprising:

at least one processor;

a storage system; and one or more programs that are stored in the storage system and are executed by the at least one processor, the one or more programs comprising:

a setting unit, which sets the at least one relay node to work in the fully-functional operating mode and sets the plurality of ordinary nodes to work in the semi-functional operating mode;

a detecting unit, which detects whether a power of the at least one relay node is lower than a predetermined threshold, confirms that the at least one relay node lacks power when the power of the at least one relay node is lower than the threshold, and collects power information and address information of ordinary nodes neighboring the at least one relay node which lacks power; and a selecting unit, which selects a new relay node from among the neighboring ordinary nodes according to the power information and the address information of the neighboring ordinary nodes;

wherein the setting unit sets the new relay node to work in the fully-functional operating mode and sets the at least one relay node which lacks power to work in the semi-functional operating mode as an ordinary node;

wherein the setting unit further calculates a plurality of ratios between a plurality of distances and the powers of the neighboring ordinary nodes according to the power information and the address information of the neighboring ordinary nodes, the plurality of distances are between the neighboring ordinary nodes and the at least one relay node which lacks power, and the new relay node selected by the setting unit is one of the neighboring ordinary nodes which corresponds to the smallest of the plurality of ratios.

2. The power management device of claim 1, wherein the new relay node selected by the setting unit is one of the neighboring ordinary nodes whose power is the highest among the neighboring ordinary nodes and is also higher than that of the at least one relay node which lacks power.

3. The power management device of claim 1, wherein the setting unit maintains the at least one relay node which lacks power upon condition that none of the neighboring ordinary nodes has a higher power than the at least one relay node which lacks power.

4. A power management method of a wireless sensor network, the method applied to a power management device, the wireless sensor network comprising a plurality of network nodes, the plurality of network nodes comprising at least one relay node and a plurality of ordinary nodes, each of the network nodes configured to selectively work in a fully-functional operating mode or a semi-functional operating mode, the method comprising:

setting the at least one relay node to work in the fully-functional operating mode and setting the plurality of ordinary nodes to work in the semi-functional operating mode;

detecting whether a power of the at least one relay node is lower than a predetermined threshold;

confirming that the at least one relay node lacks power when the power of the at least one relay node is lower than the threshold, and collecting power information and address information of ordinary nodes neighboring the at least one relay node which lacks power;

selecting a new relay node according to the power information and the address information of the neighboring ordinary nodes; and setting the new relay node to work in the fully-functional operating mode and setting the at least one relay node which lacks power to work in the semi-functional operating mode as an ordinary node;

wherein selecting the new relay node according to the power information and the address information of the neighboring ordinary nodes comprises:

calculating a plurality of ratios between a plurality of distances and the powers of the neighboring ordinary nodes according to the power information and the address information of the neighboring ordinary nodes, wherein the plurality of distances are between the neighboring ordinary nodes and the at least one relay node which lacks power; and selecting one of the neighboring ordinary nodes which corresponds to the smallest of the plurality of ratios as the new relay node.

5. The method of claim 4, wherein selecting the new relay node according to the power information and the address information of the neighboring ordinary nodes comprises:

selecting the new relay node which is one of the neighboring ordinary nodes whose power is the highest among the neighboring ordinary nodes and is also higher than that of the at least one relay node which lacks power.

6. The method of claim 4, further comprising, instead of selecting a new relay node according to the power information and the address information of the neighboring ordinary nodes:

maintaining the at least one relay node which lacks power upon condition that none of the neighboring ordinary nodes has a higher power than the at least one relay node which lacks power according to the power information of the neighboring ordinary nodes.

* * * * *